United States Patent [19]

Muller

[11] Patent Number: 4,682,944

[45] Date of Patent: Jul. 28, 1987

[54] ELECTRICALLY HEATED INJECTION NOZZLE AT THE END OF A HOT RUNNER

[75] Inventor: Walter Muller, Battenberg, Fed. Rep. of Germany

[73] Assignee: Ewikon Entwicklung und Konstruktion GmbH & Co. KG, Herford, Fed. Rep. of Germany

[21] Appl. No.: 732,477

[22] Filed: May 9, 1985

[30] Foreign Application Priority Data

May 10, 1984 [DE] Fed. Rep. of Germany ....... 3417220

[51] Int. Cl.$^4$ .............................................. B29C 45/20
[52] U.S. Cl. .................................... 425/549; 425/588; 425/DIG. 227; 425/572
[58] Field of Search ........................ 425/549,564–572, 425/588, DIG. 224, DIG. 227

[56] References Cited

U.S. PATENT DOCUMENTS

| | | | |
|---|---|---|---|
| 3,822,856 | 7/1974 | Gellert | 425/549 X |
| 4,094,447 | 6/1978 | Gellert | 425/568 X |
| 4,171,941 | 10/1979 | Votsutsuji et al. | 425/566 X |
| 4,285,660 | 8/1981 | Mueller | 425/549 |
| 4,340,156 | 7/1982 | Muller | 425/549 X |
| 4,344,750 | 8/1982 | Gellert | 425/549 X |
| 4,450,999 | 5/1984 | Gellert | 425/549 X |
| 4,492,556 | 1/1985 | Crandell | 425/549 |
| 4,514,160 | 4/1985 | Davidsmeyer | 425/549 X |
| 4,580,037 | 4/1986 | Muller | 425/549 X |

Primary Examiner—Robert Spitzer
Attorney, Agent, or Firm—Sprung Horn Kramer & Woods

[57] ABSTRACT

The injection nozzle has a central heating rod (1) and jacket components (2 and 3), with the heating rod connected at the upper end with one (3) of the jacket components and at the lower end, through a fork (8), with the other (2). The jacket components are electrically insulated from each other by disks (4 and 5) and demarcate an annular channel (15) for the plastic to flow through. The plastic is introduced into the channel at the top and through exits (14) at the bottom into the supply aperture of an injection mold. The nozzle has two points (11) at the bottom, each extending into or into the vicinity of one supply aperture to a mold cavity. Two mold cavities can accordingly be simultaneously filled with plastic by one injection nozzle.

14 Claims, 16 Drawing Figures

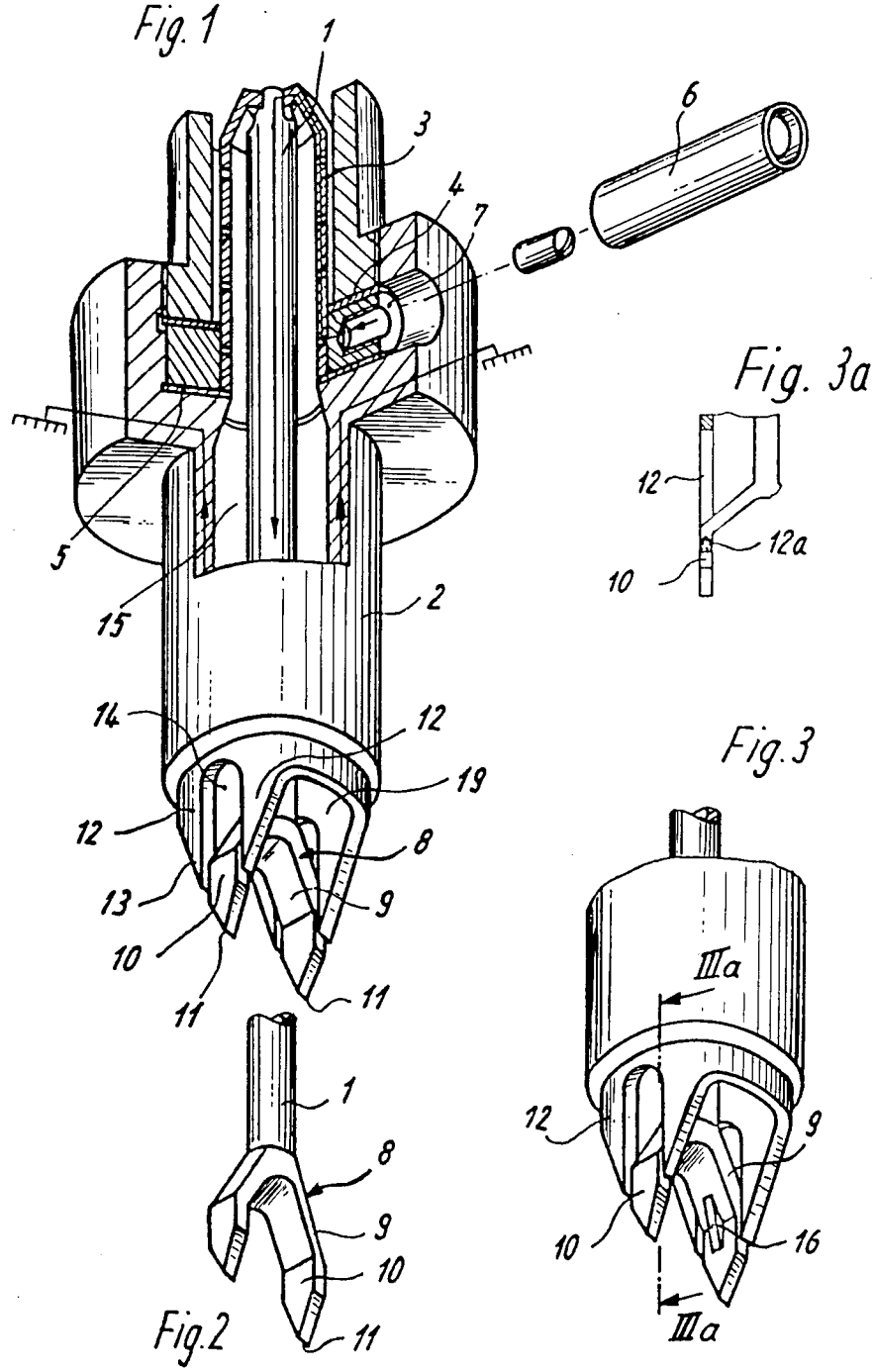

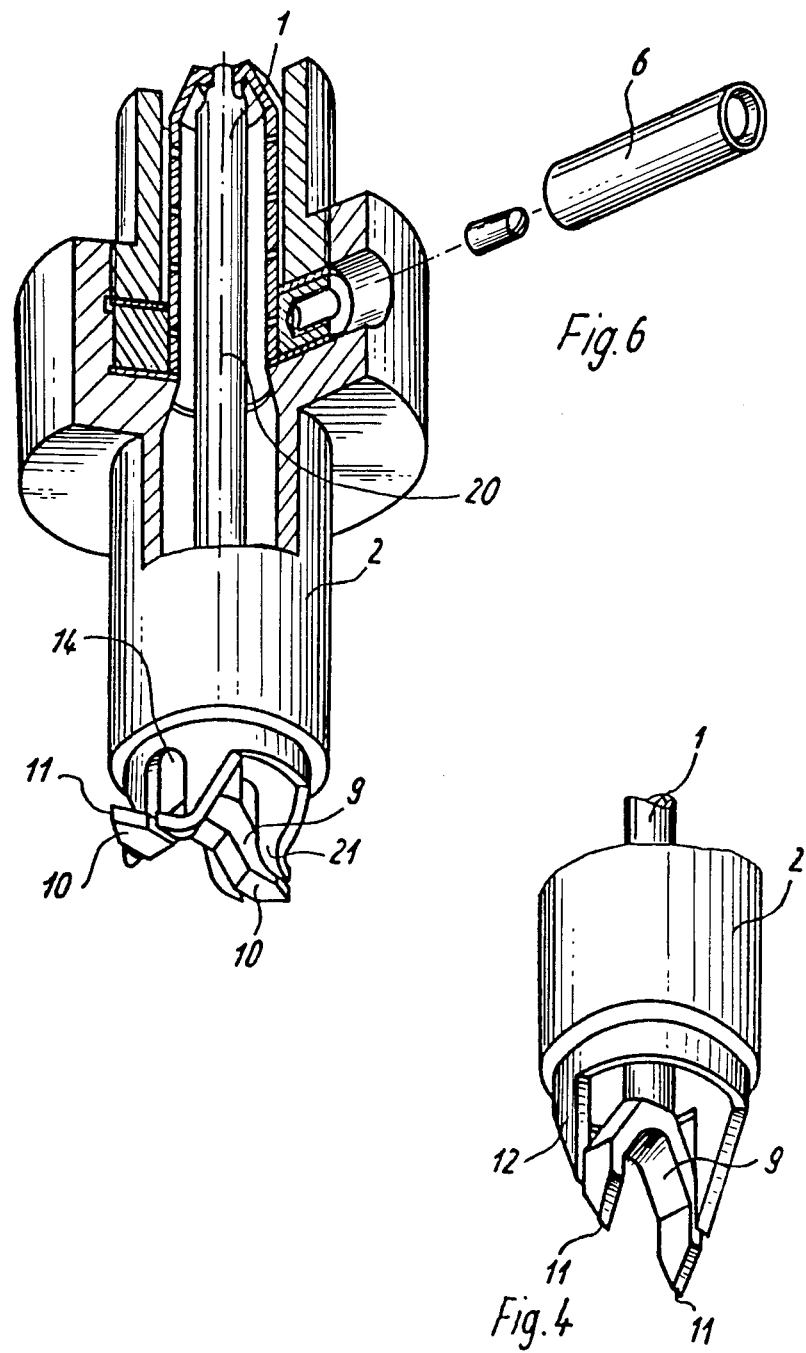

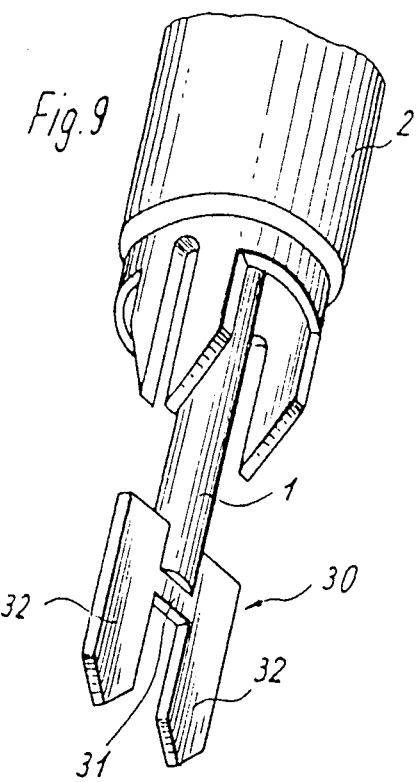
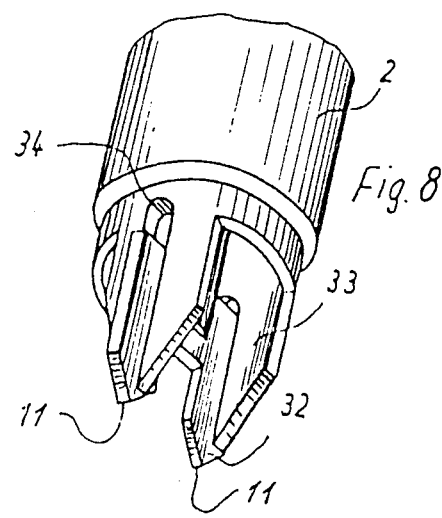

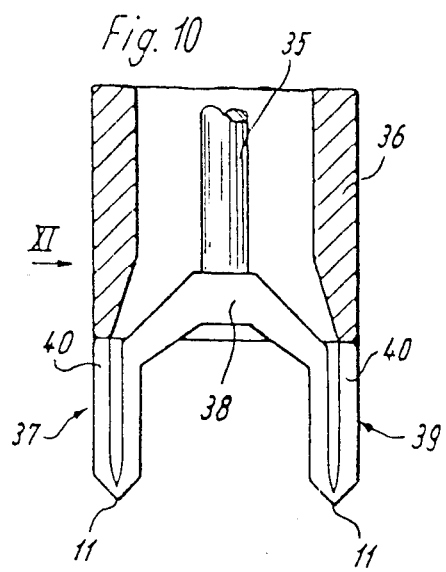
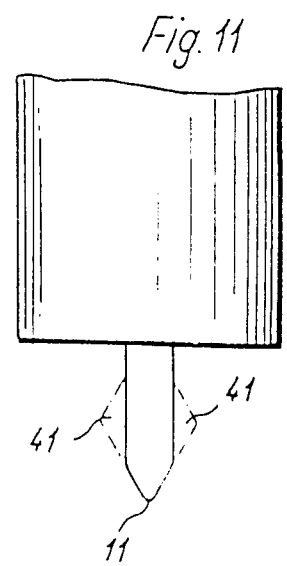
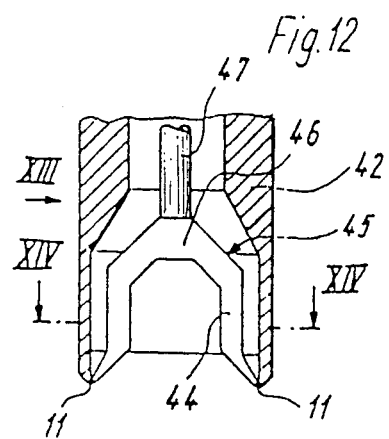
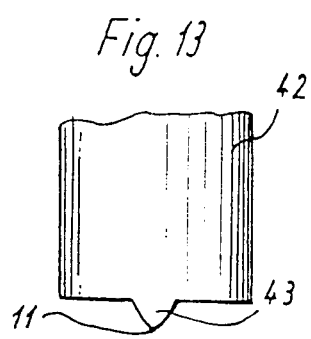
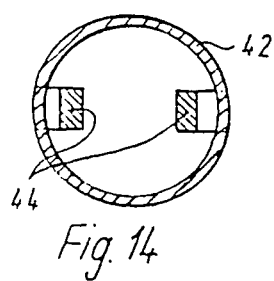
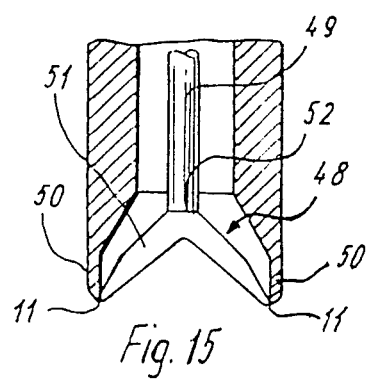

ELECTRICALLY HEATED INJECTION NOZZLE AT THE END OF A HOT RUNNER

The present invention relates to an electrically heated injection nozzle at the end of a hot runner, with an annular jacket component that fits into the block containing the runner, and with an annular channel for the injected plastic to flow through between the inner surface of the jacket component and the outer surface of a heating rod, whereby the heating rod extends through the center of the jacket component to the supply aperture of an associated mold cavity and the tapered point of the heating rod, which extends into the supply aperture, is part of an electric-resistance heating system and is connected to the jacket component by webs that demarcate one or more exits for the plastic emerging from the annular flow channel.

An electrically heated injection nozzle of this type is known from German Pat. No. 2 824 971. Since it has only one point, one injection nozzle must be employed for each mold cavity.

The object of the present invention is to provide an electrically heated injection nozzle of the type initial described that can be employed to inject plastic into at least two mold cavities at the same time.

This object is attained in accordance with the invention in that the injection nozzle has several points, each of which extends into or into the vicinity of a supply aperture that leads into a mold cavity.

Since the injection nozzle can have two, three, four, or even more points, one nozzle can be employed to fill the same number of mold cavities, which can be slightly separated.

Further characteristics of the invention will be evident from the subsidiary claims and from the following description by way of example of practical embodiments, in each of which the injection nozzle has two points.

In the drawings,

FIG. 1 is a partly dissected perspective view of an injection nozzle,

FIG. 2 illustrates a detail of the injection nozzle in FIG. 1,

Figure 5:
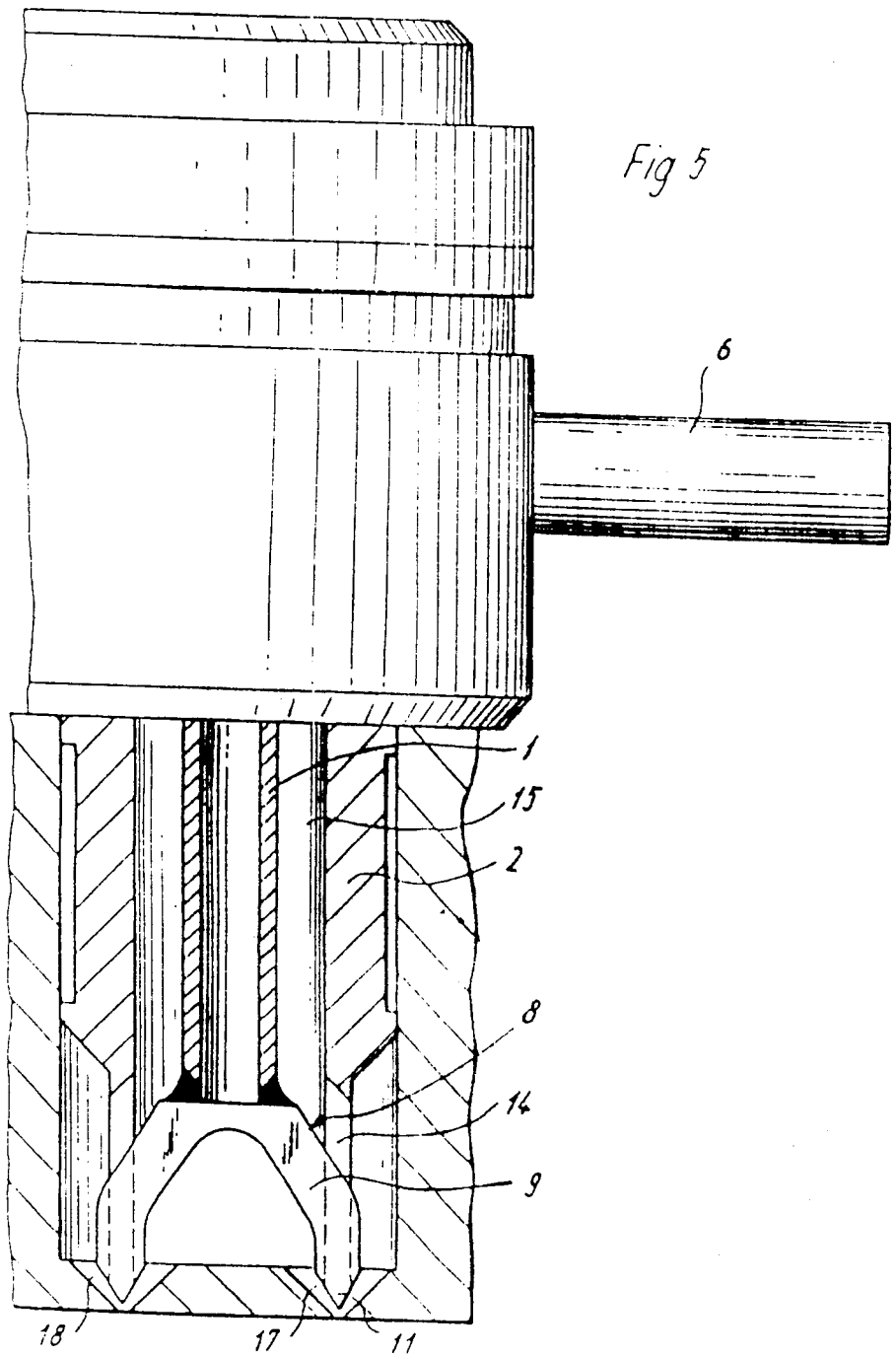
Figure 7:
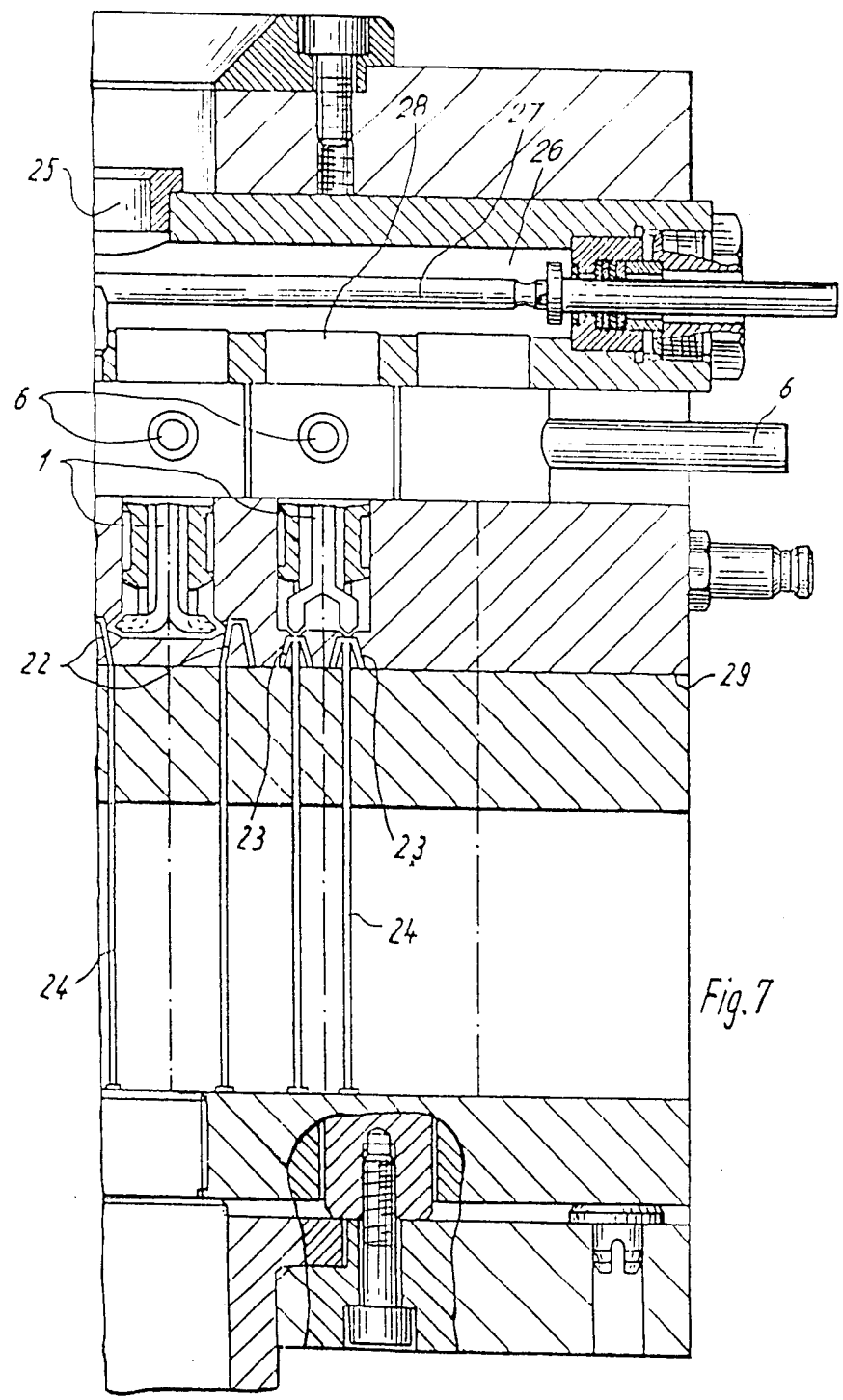

FIG. 3 is a perspective view of one variant of the injection nozzle illustrated in FIG. 1, FIG. 3a is a section along the line IIIa—IIIa in FIG. 3, FIG. 4 is another variant of the injection nozzle illustrated in FIG. 1, FIG. 5 illustrates an injection nozzle built into a block containing a hot runner, FIG. 6 is a partly dissected perspective view of an injection nozzle with points situated in a plane that extends across its longitudinal axis, FIG. 7 illustrates the injection nozzles from FIGS. 1 and 6 built into a block containing a hot runner and having an injection mold associated with it, FIG. 8 illustrates another embodiment of an injection nozzle, FIG. 9 illustrates the injection nozzle in FIG. 8 partly disassembled, FIG. 10 is a section through part of another embodiment, FIG. 11 is a view along the direction indicated by arrow XI in FIG. 10, FIG. 12 illustrates an embodiment with short jacket tongues, FIG. 13 is a view along the direction indicated by arrow XIII in FIG. 12, FIG. 14 is a section along line XIV—XIV in FIG. 12, and FIG. 15 is a variant of the embodiment illustrated in FIG. 12.

The injection nozzle illustrated in FIG. 1 consists of a central heating rod 1, of a forward jacket component 2, and of a rear jacket component 3. Jacket components 2 and 3 are insulated from each other by means of insulating disks 4 and 5 and connected by heating rod 1.

Current is supplied through a plug 6 and an annular contact 7 conductively connected to rear jacket component 3.

Plug 6 is illustrated disassembled in FIG. 1, which also shows the direction in which the current flows: through annular contact 7, rear jacket component 3, heating rod 1, and the grounded forward jacket component 2. Heating rod 1 can be made of chrome-nickel steel and jacket components 2 and 3 of structural steel, although they can also be made of chrome-nickel steel. Heating rod 1 has a fork 8 at the bottom. The fork can be welded to it. Fork 8 has two shanks 9 with ends 10 that terminate in a point 11.

Each fork shank 9 in the embodiment illustrated in FIG. 1 is connected to two jacket tongues 12. The free ends of tongues 12 terminate in points 13 that are welded to the ends 10 of fork shanks 9. Each jacket tongue 12 demarcates in conjunction with its associated fork shank 9 an exit 14 for the plastic, which is supplied at the upper end of the injection nozzle to an annular flow channel 15 through unillustrated apertures in rear jacket component 3. Flow channel 15 is demarcated by the inner surface of jacket components 2 and 3 in conjunction with the outer surface of heating rod 1.

Temperatures up to 400° C. can occur in the injection nozzle, which is heated by electric resistance.

The fork shanks 9 in the embodiment illustrated in FIG. 3 have one or more ribs 16 on their inner surface to augment heat flow from the shanks to the plastic. The ribs can also or only be on the outside of the shanks.

Whereas two jacket tongues 12 are associated with and welded to each fork shank 9 in the embodiments illustrated in FIGS. 1 and 3, FIG. 4 illustrates an embodiment in which only one jacket tongue 12 is associated with and welded to each fork shank 9. FIG. 3a illustrates the weld 12a between one fork shank 9 and one jacket tongue 12. It tapers against the direction that the plastic flows in.

Jacket tongues 12 and their vicinity are not as thick as the rest of forward jacket component 2.

FIG. 5 illustrates an injection nozzle that has a tubular heating rod 1. It is welded at the bottom to fork 8. The points 11 of the shanks 9 of fork 8 extend into or into the vicinity of supply apertures 17 and 18 leading to two mold cavities, which are not illustrated in FIG. 5.

From annular flow channel 15 the plastic arrives at supply apertures 17 and 18 through exits 14 and apertures 19.

Current flows through both fork shanks 9. The tubular version of heating rod 1 is especially practical for matching its current density to its heat-exchanging surface. It is, however, also conceivable for the cross-section of the rod to be in the shape of a star or other geometrical shape.

Since twice as much plastic will flow along a heating rod 1 that is tubular or that has a cross-section shaped like a star etc. as along each fork flank, the amount of molten plastic that must be maintained along the rod will be a multiple equivalent to the number of fork shanks.

FIG. 6 illustrates an injection nozzle in which the ends 10 of fork shanks 9, each of which has one point, extend across longitudinal axis 20. The longitudinal axis of the ends 10 in this embodiment are at a right angle to the longitudinal axis 20 of the injection nozzle itself. It is however also conceivable for this angle to be acute.

Two jacket tongues 21 are associated with each fork shank 9 in this embodiment. The points of tongues 21 are deformed to match the direction of ends 10 and welded to them.

FIG. 7 is a section through part of a plastic-injection mold that is equipped with one injection nozzle of the type illustrated in FIG. 6 and with one injection nozzle of the type illustrated in FIG. 1. Two mold cavities 22 or 23 are associated with each nozzle. Plastic is injected into each cavity at the same time by one nozzle.

An ejector rod 24 is associated with each cavity.

The mold has a bushing 25 that accommodates a machine nozzle. A distributor channel 26 is filled with plastic through the machine nozzle. A longitudinal hot wire 27 extends through distributor channel 26 to heat the plastic. From distributor channel 26 the plastic arrives in the electrically heated injection nozzles, the rear ends 28 of which extend into distributor channel 26. The plastic flows through the heated injection nozzles and arrives in mold cavities 22 and 23 through exits at the front end of the nozzles. The mold is opened at a plane 29 to remove the hardened castings.

As will be evident from FIGS. 8 and 9, fork 30 can also be a stamped-out piece of sheet metal.

The fork in FIGS. 8 and 9 is U-shaped, with a web 31 that engages a groove in heating rod 1, which is welded to fork 30.

Two jacket tongues 33 are also associated with and welded to the shanks 32 in this embodiment as well. Tongues 33 demarcate exits 34 for the plastic in conjunction with fork shanks 32. There is also one exit between each pair of diametrically opposite exits.

The embodiment illustrated in FIGS. 10 and 11 has a shape 37 welded to heating rod 35 and jacket component 36. Shape 37 can be a sheet-metal stamping, a casting, or an extruded section.

The shape 37 illustrated in FIG. 10 has a central bridge 38 welded to a heating rod 35, which is a round rod. Shape 37 has two U-shaped fork shanks 39 with outer webs 40 welded to jacket component 36. Each shank has a point 11 at its free end. At least one of the outer demarcating surfaces of shape 37 can have one or more outward-facing ribs 41 as indicated by the dot-and-dash lines in FIG. 11.

The jacket 42 in the embodiment illustrated in FIGS. 12 and 13 has short tongues 43 with outer edges in the shape of points 11. Tongues 43 are welded to the fork shanks 44 of a shape 45 that is itself welded in the vicinity of a bridge 46 to a heating rod 47.

The shape 45 in the embodiment illustrated in FIGS. 12 and 13 is almost completely surrounded by jacket 42.

The shape 48 in the embodiment illustrated in FIG. 15 is in the form of a V and welded to a heating rod 49 and to jacket tongues 50. Since it has short fork shanks 51, the weld 52 between shape 48 and heating rod 49 is slightly separated from jacket tongues 50.

I claim:

1. In an electrically heated injection nozzle for a hot runner, having a central heating rod, an annular jacket component around the rod forming an annular channel through which injected plastic flows, wherein the heating rod extends through the center of the jacket component and terminates in an end portion which is received in a supply aperture of an associated mold cavity and wherein the end portion of the heating rod, which extends into the supply aperture, is part of an electric-resistance heating system, the improvement wherein: the end portion of the heating rod comprises a fork-shaped member having fork shanks with free ends terminating in points each of which extends at least into the vicinity of the supply apertures and wherein the jacket component has at least one jacket tongue for each shank jacket tongue terminating in a point and connected to one shank.

2. The nozzle as in claim 1, wherein each fork shank is connected to two jacket tongues and wherein the tongues and shank form an outlet from the annular channel.

3. The nozzle as in claim 1, wherein each jacket tongue is welded to its associated fork shank, with the weld tapering against the direction of plastic flow.

4. The nozzle as in claim 1, wherein the nozzle has a longitudinal axis and the ends of the fork shanks having the points are parallel to the longitudinal axis.

5. The nozzle as in claim 1, wherein the nozzle has a longitudinal axis and the ends of the fork shanks having the points extend transverse to the longitudinal axis.

6. The nozzle as in claim 4, wherein the angle between the shanks and the longitudinal axis of the injection nozzle is acute.

7. the nozzle as in claim 1, further comprising at least one rib on the surface of each fork shank.

8. The nozzle as in claim 1, wherein the heating rod comprises a tube with the fork-shaped welded to one end.

9. The nozzle as in claim 1, wherein the fork-shaped member is welded to one end of the heating rod.

10. The nozzle as in claim 9, wherein the fork-shaped member has a central bridge welded to the heating rod and two U-shaped fork shanks with a point at the free ends thereof and with outer webs welded to the jacket component.

11. The nozzle as in claim 10, wherein at least one outer demarcuating surface of the fork-shaped member has at least one outward-facing rib.

12. The nozzle as in claim 10, wherein the jacket component has short tongues and the fork-shaped member is welded at its free ends to the jacket tongues and is almost completely inside the space demarcated by the jacket component.

13. The nozzle as in claim 9, wherein the weld between the fork-shaped member and the heating rod is separated from the jacket tongues.

14. The nozzle as in claim 9, wherein the fork-shaped member is in the form of a V as viewed from the side.

* * * * *